United States Patent [19]

Cunningham

[11] Patent Number: 5,245,487
[45] Date of Patent: Sep. 14, 1993

[54] TRANSDUCER HEAD FOR RIGID DISK DRIVE

[75] Inventor: Earl A. Cunningham, Rochester, Minn.

[73] Assignee: International Business Machines Corporation, Armonk, N.Y.

[21] Appl. No.: 784,067

[22] Filed: Oct. 30, 1991

Related U.S. Application Data

[63] Continuation of Ser. No. 303,482, Jan. 27, 1989, abandoned.

[51] Int. Cl.$^5$ .................... G11B 5/58; G11B 5/596
[52] U.S. Cl. ........................ 360/77.01; 360/77.05
[58] Field of Search .... 360/77.01, 77.02, 77.03–77.17, 360/110, 121, 122, 109

[56] References Cited

U.S. PATENT DOCUMENTS

| | | |
|---|---|---|
| 3,823,416 | 7/1974 | Warner . |
| 4,079,426 | 3/1978 | Umeda et al. . |
| 4,352,134 | 9/1982 | Burns et al. . |
| 4,402,025 | 8/1983 | Anderson et al. ............... 360/98.01 |
| 4,488,188 | 12/1984 | Hansen et al. .................... 360/77.11 |
| 4,490,756 | 12/1984 | Dost et al. ......................... 360/77.11 |
| 4,551,777 | 11/1985 | Saito et al. ........................ 360/77.11 |
| 4,669,003 | 5/1987 | Bell et al. .......................... 360/77.05 |
| 4,890,174 | 12/1989 | Chalmers et al. ................ 360/77.05 |

FOREIGN PATENT DOCUMENTS

| | | |
|---|---|---|
| 2630559 | 1/1977 | Fed. Rep. of Germany . |
| 57-105870 | 7/1982 | Japan . |
| 61-258326 | 11/1986 | Japan . |

OTHER PUBLICATIONS

IBM TDB, vol. 21, No. 2, "Quad-Burst PES System for Disk File Servo", Herrington et al., Jul. 1978, pp. 804–805.
IBM Technical Disclosure Bulletin, vol. 8, No. 4, Sep. 1965, "Readback System for High Track Density . . . ".

*Primary Examiner*—Steven R. Garland
*Attorney, Agent, or Firm*—Philip M. Kolehmainen; Bradley A. Forrest

[57] ABSTRACT

A dedicated servo transducer head for phase skewed position information signals in servo information tracks of a rigid magnetic disk drive unit has a width spanning up to eight servo information tracks in order to overcome problems in gain irregularity caused by abrupt phase jumps between tracks. An embodiment of the invention includes a track reading surface that varies in sensitivity across the width of the head to avoid gain loss during incremental radial movement with head edges overlying track edge fringes.

15 Claims, 2 Drawing Sheets

SENSITIVITY

GAIN

TRANSDUCER HEAD FOR RIGID DISK DRIVE

This application is a continuation of U.S. application Ser. No. 07/303,482 filed Jan. 27, 1989, now abandoned, by Cunningham, entitled "Transducer Head For Rigid Disk Drive", and assigned to the same assignee as this patent application.

FIELD OF THE INVENTION

The present invention relates to improvements in heads for reading servo position control information recorded in tracks on a magnetic medium, and more particularly to improved dedicated transducer heads for reading phase related servo patterns recorded in tracks on a disk of a magnetic rigid disk drive unit.

DESCRIPTION OF THE PRIOR ART

Disk drive units incorporating stacked, commonly rotated rigid magnetic disks are used for storage of data in magnetic form on the disk surfaces. Transducer heads driven in a path toward and away from the drive axis write data to the disks and read data from the disks. The data is recorded in concentric, radially spaced data information tracks arrayed on the surfaces of the disks.

Servo position control is used to position these data heads is registration with the data information tracks. One servos system uses a dedicated transducer head to read position signals recorded in servo information tracks on a disk surface. The data heads are ganged with the servo head for simultaneous movement relative to the data information tracks and the servo information tracks. To access the disk drive unit, a feedback controlled drive system locates the servo head in a desired position, thereby to locate a data head in registration with a specific data information track where data is to be written or read.

In one known rigid disk drive unit servo position control system, servo information tracks are arrayed at intervals equal to one half the intervals of the data information tracks. Servo information is written to the servo tracks with timing variations from track to track and the phase difference between tracks is detected by the servo transducer head as an indicator of the radial head position. In one known skewed phase pattern, the servo information is circumferentially offset by twenty-two and one half degrees in adjacent tracks in progression radially across the disk surface. The servo transducer head reads this information from the rotating disk surface to supply a position error signal employed in a feedback drive system to locate the servo head, and thus the data heads, in a desired position. There is a direct two to one correspondence between servo tracks and data tracks, and when the servo head is located with respect to a pair of servo tracks, the data head is located with respect to one data track.

Servo heads used currently are wide enough to read a single data information track or a single pair of servo information tracks. Known servo transducer heads have generally uniform characteristics and uniform spacing from the magnetic medium across their width. Consequently, known servo heads have uniform sensitivity to recorded information from edge to edge.

Position error signals provided by this conventional arrangement are subject to problems leading to difficulties in accurate and consistent head positioning during disk access. The signal detected by a servo transducer head of conventional width is effected strongly by the abrupt phase jumps between adjacent servo information tracks. As a result, a conventional head is incapable of providing a smooth, linear position error signal. In addition, the signal is low in amplitude and is undesirably sensitive to variations in parameters including written track density, servo head dimensional tolerances and misregistration between servo and data tracks. Another disadvantage of the conventional design is that the position error signal is adversely affected by head jitter in the circumferential or time direction as well as jitter in the radial direction that may accompany non regular bearing runout during writing of the servo tracks.

In addition to these problems, yet another difficulty with the standard servo head arises from the effect of the edge fringe areas separating the written servo information tracks. The nonmagnetized regions between tracks act as dead zones in which no signal change is detected in response to increments of radial servo head movement. The severity of this undesired effect depends upon servo head width compared to track width. If the head width is equal to an integer number of track widths, no gain in position error signal is present when both edges of the head are aligned with edge fringe areas. For other widths, gain is seriously attenuated when either edge of the head is aligned with an edge fringe area.

SUMMARY OF THE INVENTION

A principal object of the present invention is to provide an improved servo transducer head for detecting a position error signal from radially skewed position signals in servo information tracks of a disk drive unit. Other objects are to provide a servo information head producing a highly linear position error signal that is relatively insensitive to factors including track width, written track density, track misregistration and jitter; to provide a servo information head that has a robust design that is relatively inexpensive to make and is not subject to close tolerance requirements; and to provide a servo transducer head that minimizes problems arising from abrupt phase jumps between adjacent servo information tracks. An object of an additional feature of the invention is to provide a servo transducer head that overcomes difficulties arising from edge fringe fields between adjacent servo information tracks by providing a position error signal that exhibits gain in response to radial movement at any location relative to the servo information tracks. Further objects of the invention are to provide improved methods for detecting position error signals from radially skewed position signal patterns recorded on a magnetic medium, and to overcome problems encountered with methods and servo transducer heads used in the past.

In brief, the objects and advantages of the present invention are achieved by providing an improved servo transducer head for a rigid magnetic disk drive unit. The disk drive unit includes a housing and a plurality of magnetic disks mounted in the housing for simultaneous rotation about an axis. Data information tracks on at least a first of the disks are arrayed in a pattern around the axis. An array of adjacent servo information tracks on at least a second of the disks is in a pattern around the axis, and the servo information tracks have a predetermined position corresponding to the data information tracks. Position information signals are recorded in the servo information tracks in a radially skewed progression across the array of adjacent servo information tracks. A data transducer head moves in a radial direction across the first disk for reading or writing information on the data information tracks. A servo transducer head moves in a radial direction across the second disk for reading the position information signals from the servo information tracks. The data and servo transducer heads are ganged together for interrelated movement. A control system connected to the servo transducer head moves the servo transducer head to a selected position in response to position information signals read by the servo transducer head. In accordance with the invention, the servo transducer head has a width sufficient to span a plurality greater than two of the servo information tracks.

In accordance with a further feature of the invention, there is provided a servo transducer head with a nonuniform sensitivity to position information signals in a plurality of servo information tracks read simultaneously by the head.

In accordance with the present invention, there is provided a method of detecting a position error signal from a sequence of servo information tracks arrayed on a magnetic medium, the tracks containing a magnetically recorded regular sequence of radially skewed position signals. The method includes the steps of reading the position signal from a first track and reading the position signals from a pair of second tracks adjacent opposite sides of the first track. The position signals read from the first and second tracks are summed together to provide the detected position error signal. There is also provided a method including the steps of reading position signals from a region of the magnetic medium in which a plurality of servo information tracks are located and summing the position signals. The position signals are variably weighted, with relatively higher sensitivity at the central portion of the region and with gradually decreasing sensitivity away from the central portion of the region.

BRIEF DESCRIPTION OF THE DRAWINGS

The present invention together with the above and other objects and advantages may best be understood from the following detailed description of the embodiments of the invention illustrated in the drawings, wherein.

DETAILED DESCRIPTION OF THE PREFERRED EMBODIMENT

Figure 1:
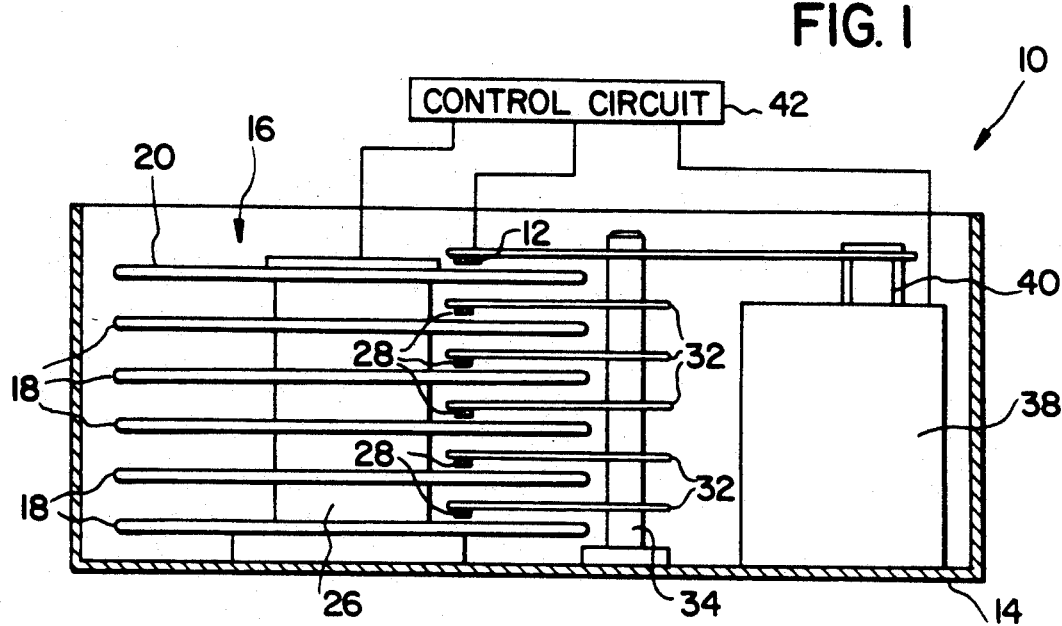
FIG. 1 is a partly schematic and simplified vertical sectional view of a rigid magnetic disk drive unit embodying the present invention.
Figure 2:
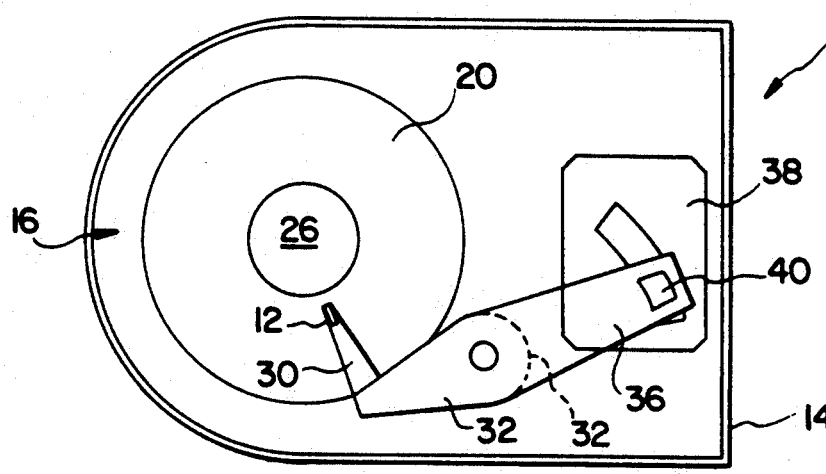
FIG. 2 is a top plan view of the structure shown in FIG. 1.

Referring now to FIGS. 1 and 2 of the drawings, there is shown a rigid magnetic disk drive unit generally designated as 10 including a dedicated servo transducer head 12 embodying principles of the present invention. Unit 10 is illustrated in greatly simplified form sufficient for an understanding of the present invention because the utility of the present invention is not limited to the details of a particular drive unit construction.

Disk drive unit 10 includes a housing 14 enclosing a stack 16 of disks 18 and 20 having magnetic surfaces. Disks 18 are data disks on which numerous data information tracks 22 (FIG. 5) are arrayed in a concentric pattern in the magnetic medium provided by a layer of magnetic material on the disk surface. Disk 20 includes a pattern of concentric servo information tracks 24 in the magnetic medium. The disks 18 and 20 are mounted in parallel for simultaneous rotation on and by an integrated spindle and motor assembly 26. The data information tracks 22 on disks 18 are read and/or written to by data transducer heads 28 movable across the disk surface. The servo information tracks are read by the servo transducer head 12. The disks are shown as single sided for simplicity, but most rigid magnetic disk drive units employ disks with opposed magnetic surfaces and transducer heads at both sides of each disk.

Transducer heads 12 and 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the illustrated motor 38 includes a coil 40 cooperating with a magnet and core assembly (not seen).

When a call for disk access is received in conventional manner by a control circuit 42, motor 26 is operated to rotate the disk stack 16 and the control circuit employs known servo control principles to move the data heads 28 into a selected radial position with one head 28 aligned with a single data information track where data is to be read or written. This positioning operation utilizes feedback control to locate the servo transducer head 12 in a specific radial position corresponding to the selected radial position of the data head 28 through which disk access is requested. A position error signal is detected as the servo information tracks 24 are read by the servo transducer head 12 and the position error signal is communicated to the control circuit 42 for feedback controlled energization of the motor 38.

Figure 5:
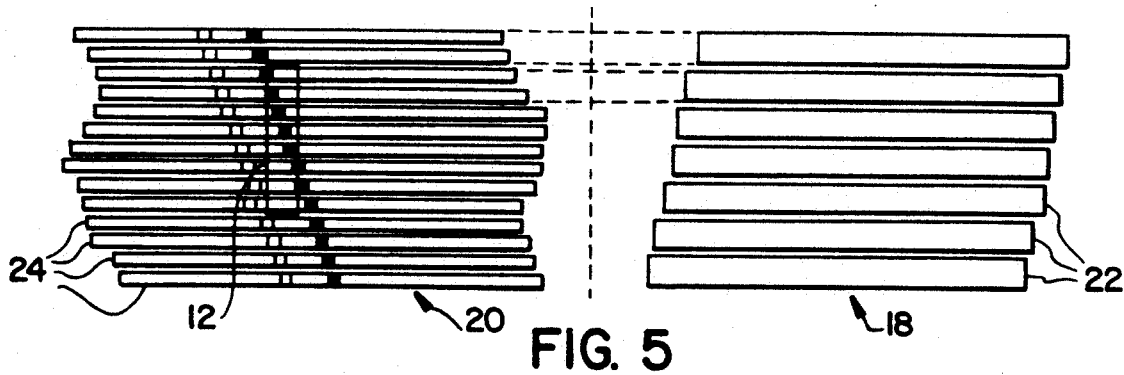
FIG. 5 is an enlarged diagram illustrating relationships between disk drive data information tracks and servo information tracks and a servo transducer head embodying the present invention.

Servo transducer head 12 is a dedicated head because it is used only to read position information recorded in the servo information tracks of disk 20. As seen in FIG. 5, the pitch of the data information tracks 22 is larger than the pitch of the servo information tracks, and two servo information tracks correspond to each single data information track. When the servo transducer head is centered in radial alignment with the proper pair of servo information tracks by circuit 42 and motor 38, the data transducer heads are radially aligned with specific corresponding data information tracks. This specific geometric relationship is not a requirement of this invention.

In the disclosed embodiments of the invention the position information signals include signals that are written to the servo information tracks with a timing deviation in the form of a phase skew in sequence from track to track. This position information is typically prerecorded on disk 20 incident to the manufacture of the disk drive unit 10. As the servo transducer head 12 moves radially with respect to the rotating disk 20, the relative phase differences between adjacent tracks are detected and used by control circuit 42 as an indication of radial head position. Since the data transducer heads 28 must be aligned relative to disks 18 with a high degree of accuracy, it is important that the position error signal detected by head 12 be as linear as possible with consistent gain during radial movement.

Figure 3:
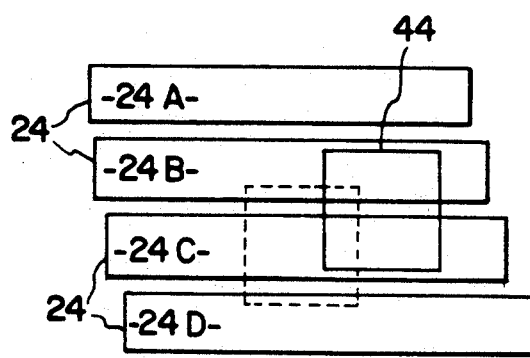
FIG. 3 is an enlarged diagram illustrating relationships between disk drive servo information tracks and a known transducer head.
Figure 4:
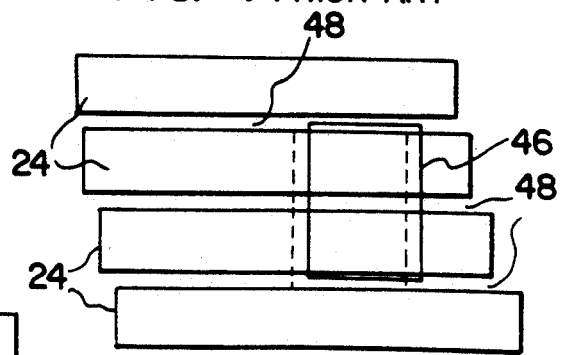
FIG. 4 is a diagram similar to FIG. 3 illustrating relationships between disk drive servo information tracks and another known transducer head.

FIGS. 3 and 4 illustrate the interaction of conventional servo transducer heads 44 and 46 with servo information tracks 24. These illustrations are highly diagrammatic, and are not to scale. FIG. 3 shows a conventional servo transducer head 44 having a width generally equal to but slightly smaller than one data information track or to two half pitch servo information tracks 24. In a typical arrangement, the adjacent tracks 24A, 24B, 24C and 24D include position information signals that are radially skewed or offset by 22.5 degrees per track. Thus, between each adjacent track pair, there is an abrupt phase jump of 22.5 degrees. Different systems may use different offset amounts, but the abrupt phase jump remains.

In the solid line position of head 44 in FIG. 3, the head is centered over two adjacent tracks 24. The head detects a position error signal that is a phase average of the signals recorded in tracks 24B and 24C. In response to incremental radial movement of head 44 from this position, the position error signal changes. Change in the position error signal for an increment of radial displacement is referred to as the gain of the signal. For movement during which the head 44 continues to overlie only the tracks 24B and 24C, the gain is generally constant because the phase of the position error signal changes as the proportional contribution of the phases of the two tracks is varied.

In the position shown in dotted lines in FIG. 3, the head 44 is generally centered on track 24C with its edges overlying the adjacent tracks 24B and 24D. Upon incremental radial head movement, the contribution of the signal of track 24C does not change because it is fully coupled to the head 44. The detected position error signal changes with the variation in the proportions contributed by the two adjacent tracks 24B and 24D. In this incremental motion, the gain of the position error signal is also generally constant, but it has a different value than the gain, as described above, of the signal when only two tracks are read.

In the solid line head position, the varying signals from tracks 24B and 24C are offset by 22.5 degrees. In contrast, in the dotted line head position, the varying signals from tracks 24B and 24D are offset by 45 degrees. This fact results in the different gain characteristic at the full and dotted line positions of head 44. The nonlinearity in the position control signal resulting from the track to track phase jumps impairs the accuracy and speed of the servo control system.

A further difficulty of a conventional servo transducer head 46 is illustrated in FIG. 4. Head 46 is somewhat wider than head 44 relative to tracks 24, and is equal in width to the pitch of two servo information tracks 24. Differences of this magnitude may arise from track width variations or variations in manufacturing tolerances. In FIG. 4, the fringe edges between the adjacent servo information tracks 24 are designated by reference numeral 48. No position signals are present in these fringe edges, and they represent dead zones between adjacent tracks. In the solid line position of head 46, both edges of the head overlie fringe edges 48. As a result, there is no change in the detected position error signal during incremental movement between the illustrated solid line and dotted line positions. For radial movement in this region, the gain of the position error signal is zero.

The head width relative to the track width can be such that only one edge of the head can overlie a fringe edge at one time. This is the case with the relatively narrower head 44 of FIG. 3. However, even in this case, the position error signal gain is greatly reduced when an edge radially traverses a dead zone.

Complete absence of position error signal gain during radial movement of a servo transducer head is highly undesirable. The absence of gain causes an interruption in usable position control feedback information that must be compensated for in some way, as by filtering or damping or the like. This slows the access time of the drive unit and may add expense.

Figure 6:
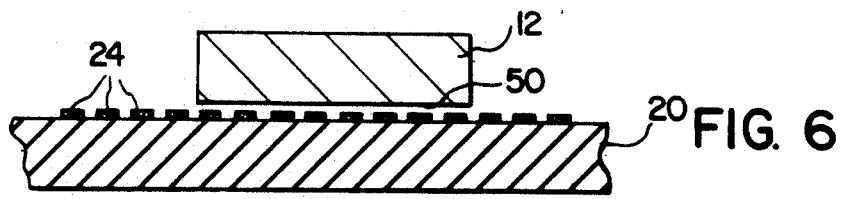
FIG. 6 is a fragmentary sectional view taken transverse to the data information tracks of a disk and part of a transducer head embodying the present invention.

Several of the disadvantages of the known heads 44 and 46 are overcome by the servo transducer head 12 shown in more detail in FIGS. 5 and 6. In accordance with the invention, the head 12 is sufficiently wide to span more of the servo information tracks 24 than the two tracks spanned by conventional heads. In the theoretical preferred embodiment the head 12 is equal in width to eight servo information tracks or four data information tracks.

The phase skew of the position information signals read from the tracks 24 in FIG. 5 is indicated by dark and light timing marks added to the tracks for purposes of illustration. The phase offset is 22.5 degrees and eight tracks 24 are equal to 180 degrees of phase offset. Head 12 reads or detects the signals from eight adjacent tracks and sums or averages them to provide the position error signal coupled to the control circuit 42. The resultant position error signal is a highly linear representation of the relative phase at the center of the head 12. Gain irregularity resulting from inter track phase jumps is greatly reduced by this summing of additional tracks. In addition, since signals from several tracks 24 are summed by the head 12, the position error signal has a desirably large amplitude.

The advantages of this feature of the invention can be achieved at least to some extent with a head width of three or more servo information tracks. In a further preferred embodiment, a head width of six servo information tracks is used to avoid skew alignment problems. In another preferred embodiment, a head width of four servo information tracks is used. The benefit of summing the position signals is maximized with a span of eight tracks where the radial phase offset is 22.5 degrees. Additional tracks have signals opposite in phase to the detected eight tracks and would decrease the accuracy of the position error signal.

The cross sectional shape of the head 12 is indicated in FIG. 6 in a plane intersecting the servo information tracks 24 on disk 20. Tracks 24 are shown as discrete regions raised from the surface of disk 20, although they do not visibly differ from the remaining magnetic surface in an accurate representation. Similarly, only the magnetically responsive part of the head 12 is illustrated and the remaining structure of the head is omitted for clarity. As is conventional, the lower magnetic track reading surface 50 of head 12 is of uniform construction across the head width and is uniformly spaced from the magnetic surface While the head 12 overcomes many problems encountered with conventional servo transducer heads, it is subject to the disadvantage that its edges do not contribute to position error signal gain when they overlie a fringe edge between adjacent tracks.

Figure 7:
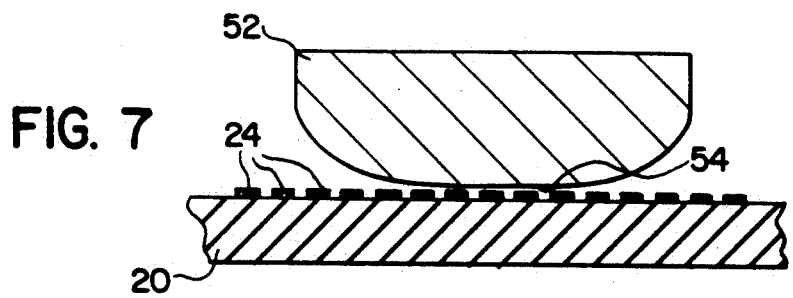
FIG. 7 is a fragmentary sectional view taken transverse to the data information tracks of a disk and part of another transducer head embodying additional features of the present invention.

A servo transducer head 52 embodying further principles of the invention is shown in FIG. 7. In accordance with the invention, the sensitivity of the head is non uniform across its width. Head 52 includes a track reading surface 54 that is not flat across the width of the head. Instead it is formed to provide a gradual change in the reading gap separation between the head reading surface and the magnetic surface of the disk 20. The sensitivity of head 52 to the recorded information varies with the distance between the disk and the head. The head 52 thus has maximum sensitivity at its center with diminishing sensitivity in both directions away from the center.

Figure 8:
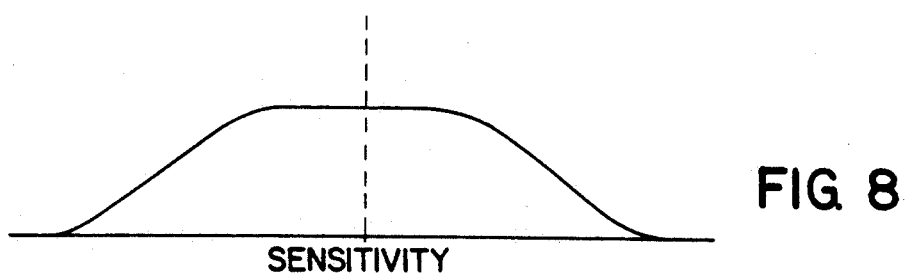
FIG. 8 is a graph illustrating the sensitivity of the transducer head of FIG. 7 across the width of the head.

The graph of FIG. 8 illustrates the varying sensitivity of head 52. in the central region of the surface 54, the surface may be flat and sensitivity may be constant. In a symmetrical fashion to either side of the central region, sensitivity decreases. Although a linear sensitivity decrease could be employed, it is preferable to shape the head 52 to obtain a nonlinear sensitivity function so that the sensitivity gain, or the rate of change in sensitivity across the width of the head 52, has no abrupt changes. In a preferred embodiment, for sinusoidal position information signals having a wavelength centering around six microns, the change in the head read gap separation varies from the normal fly height at the center up to about ten microns at the edge. This width profile may be formed by blending of a three degree bevel beginning between two and three tracks 24 to each side of the center of head 52 and a fourty-five degree edge bevel beginning about six tracks 24 to each side of the center.

Figure 9:
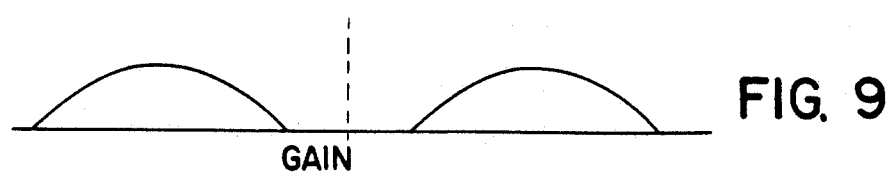
FIG. 9 is a graph illustrating the sensitivity gain of the transducer head of FIG. 7 across the width of the head.

The sensitivity function shown in FIG. 8 is flat in the central head region and includes an approximate half cycle of cosine shaped function to each side of the central region. This results in generally sunusoidal sensitivity gain characteristics in the regions of decreasing sensitivity as seen as absolute values in FIG. 9. This preferred characteristic has the advantage of filtering undesirable harmonics of the radial sensitivity from the position information signals and making the head 52 less sensitive to variations in head width or track width.

Because the track reading surface 54 of head 52 varies in sensitivity across at least some of the spanned tracks 24, there is always gain in the position error signal in response to radial movement of the head. For example, if both edges of the head are over edge fringes during incremental radial movement, certain of the tracks 24 are beneath variable sensitivity regions of the surface 52. As the head moves, the change in amplitude of the signals detected from the tracks provides a change in the summed position error signal that is utilized in position feedback control. The head 54 spans multiple track widths and has the advantages of linearity in position error signal gain described above with reference to the servo transducer head 12.

Other approaches could be employed to vary transducer sensitivity across the head width. For example, the length of the transducer gap in the direction parallel to the servo information tracks could be varied across the width of the head. However, the illustrated head 52 has the advantage that it can be easily and inexpensively manufactured. A further advantage of the invention is that both heads 12 and 52 are relatively large and sturdy shapes.

The linearity of the position error signal gain characteristic achieved by the present invention provides flexibility in the design and use of the disk drive unit 10. Because the servo transducer head can be accurately positioned at any radial location radial offsets between data and servo information tracks are possible, and a direct integer correspondence between data and servo information tracks is unnecessary. With increased amplitude and regular gain, servo information track pitch of conventional systems may be increased without sacrificing feedback position control accuracy.

While the invention has been described with reference to details of the illustrated embodiments, these details are not intended to limit the scope of the invention as defined in the appended claims.

I claim:

1. A rigid magnetic disk drive unit comprising in combination:
   a housing;
   a plurality of magnetic disks mounted in said housing for simultaneous rotation about an axis;
   data information tracks on at least a first of said disks arrayed in a pattern around said axis;
   an array of adjacent servo information tracks on at least a second of said disks in a pattern around said axis, said servo information tracks having a predetermined position corresponding to said data information tracks;
   position information signals recorded in said servo information tracks in a radially skewed phase-shifted progression across said array of adjacent servo information tracks;
   a data transducer head mounted for movement in at least partly a radial direction across said first disk for transfer of information between said data transducer head and discrete ones of said data information tracks;
   a servo transducer head mounted for movement in at least partly a radial direction across said second disk for reading said position information signals from said servo information tracks;
   means interconnecting said data and servo transducer heads for interrelated movement; and
   a control system connected to said servo transducer head for moving said servo transducer head to a selected position in response to position information signals read by said servo transducer head;
   said disk drive unit being characterized by:
   said servo transducer head having a magnetically responsive track reading surface with a read gap width sufficient to span a plurality greater than two of said servo information tracks and providing position information based upon the phase shift between greater than two consecutive servo information tracks.

2. A disk drive unit as claimed in claim 1 wherein said servo transducer head read gap width spans four of said servo information tracks.

3. A disk drive unit as claimed in claim 1 wherein said servo transducer head read gap width spans six of said servo information tracks.

4. A disk drive unit as claimed in claim 1 wherein said servo transducer head read gap width spans eight of said servo information tracks.

5. A disk drive unit as claimed in claim 1 wherein said radially skewed progression of position information signals repeats in phase across a number "n" of servo information tracks, and wherein said servo transducer head read gap width spans about n/2 of said servo information tracks.

6. A disk drive unit as claimed in claim 1 wherein said radially skewed progression of position information signals repeats in phase across a number "n" of servo information tracks, and wherein said servo transducer head read gap width spans no more than n/2 of said servo information tracks.

7. A disk drive unit as claimed in claim 6 wherein said servo transducer head read gap width spans n/2 of said servo information tracks.

8. A disk drive unit as claimed in claim 1 wherein the sensitivity of said servo transducer head read gap width to said position information signals varies across the width of said servo transducer head.

9. A disk drive unit as claimed in claim 8 wherein the sensitivity of said servo transducer head read gap width is greatest at the center of said servo transducer head.

10. A disk drive unit as claimed in claim 9 wherein the sensitivity of said servo transducer head read gap width varies in a nonlinear function at opposite sides of said center.

11. A disk drive unit as claimed in claim 10 wherein said nonlinear function is a cosine.

12. A disk drive unit as claimed in claim 8 wherein said servo transducer head read gap width is spaced from said spanned servo information tracks by a nonuniform distance.

13. A servo control system comprising:
   a magnetic surface;
   a servo transducer head movable along a path relative to said surface;
   drive means connected to at least one of said head and magnetic surface for producing said relative movement in response to control signals;
   control means connected between said servo head and said drive means for providing control signals to said drive means in response to position signals detected by said servo head; and
   an array of discrete servo information tracks on said surface intersecting said path, said servo information tracks containing position control information in a form readable by said servo head, the position control information of said servo information tracks varying in a sequenced pattern phase shifted progression along said path;
   said servo control system being characterized by:
   said servo head having a magnetically responsive track reading surface with a read gap width large enough to span at least three of said servo information tracks said head providing position control information based on the phase shifts of at least three consecutive servo information tracks.

14. A rigid magnetic disk drive unit comprising in combination:
   a housing;
   a plurality of magnetic disks mounted in said housing for simultaneous rotation about an axis;
   data information tracks on at least a first of said disks arrayed in a pattern around said axis;
   an array of adjacent servo information tracks on at least a second of said disks in a pattern around said axis, said servo information tracks having a predetermined position corresponding to said data information tracks;
   position information signals recorded in said servo information tracks in a radially skewed progression across said array of adjacent servo information tracks;
   a data transducer head mounted for movement in at least partly a radial direction across said first disk for transfer of information between said data transducer head and discrete ones of said data information tracks;
   a servo transducer head mounted for movement in at least partly a radial direction across said second disk for reading said position information signals from said servo information tracks;
   means interconnecting said data and servo transducer heads for interrelated movement; and
   a control system connected to said servo transducer head for moving said servo transducer head to a selected position in response to position information signals read by said servo transducer head;
   said disk drive unit being characterized by:
   said servo transducer head having a magnetically responsive track reading surface with a read gap width sufficient to span at least four of said servo information tracks.

15. A rigid magnetic disk drive unit comprising in combination:
   a housing;
   a plurality of magnetic disks mounted in said housing for simultaneous rotation about an axis;
   data information tracks on at least a first of said disks arrayed in a pattern around said axis;
   an array of adjacent servo information tracks on at least a second of said disks in a pattern around said axis, said servo information tracks having a predetermined position corresponding to said data information tracks;
   position information signals recorded in said servo information tracks in radially skewed progression across said array of adjacent servo information tracks repeating in phase across a number "n" of servo information tracks;
   a data transducer head mounted for movement in at least partly a radial direction across said first disk for transfer of information between said data transducer head and discrete ones of said data information tracks;
   a servo transducer head mounted for movement in at least partly a radial direction across said second disk for reading said position information signals from said servo information tracks;
   means interconnecting said data and servo transducer heads for interrelated movement; and
   a control system connected to said servo transducer head for moving said servo transducer head to a selected position in response to position information signals read by said servo transducer head;
   said disk drive unit being characterized by:
   said servo transducer head having a magnetically responsive track reading surface with a read gap width sufficient to span a plurality greater than two but no more than n/2 of said servo information tracks.

* * * * *